United States Patent [19]

Brandon

[11] Patent Number: 5,395,124
[45] Date of Patent: Mar. 7, 1995

[54] RETRACTIBLE SEGMENTED PACKING RING FOR FLUID TURBINES HAVING GRAVITY SPRINGS TO NEUTRALIZE PACKING SEGMENT WEIGHT FORCES

[75] Inventor: Ronald E. Brandon, Melbourne, Fla.

[73] Assignee: IMO Industries, Inc., Lawrenceville, N.J.

[21] Appl. No.: 148

[22] Filed: Jan. 4, 1993

[51] Int. Cl.⁶ .............................................. F16J 15/44
[52] U.S. Cl. ....................................... 277/53; 277/54; 277/192; 415/229
[58] Field of Search .................... 277/53, 54, 55, 56, 277/57, 148, 149, 150, 192; 415/229

[56] References Cited

U.S. PATENT DOCUMENTS

| | | | |
|---|---|---|---|
| 1,041,534 | 10/1912 | Wagner | 277/149 |
| 2,073,888 | 3/1937 | Toward | 277/148 |
| 3,594,010 | 7/1971 | Warth | 277/53 |
| 4,017,088 | 4/1977 | Lerjen | 277/53 |
| 4,436,311 | 3/1984 | Brandon | 277/53 |

FOREIGN PATENT DOCUMENTS

| | | | |
|---|---|---|---|
| 0950524 | 10/1956 | Germany | 277/53 |
| 54-142453 | 11/1979 | Japan | 277/53 |
| 61-152906 | 11/1986 | Japan | 277/53 |

*Primary Examiner*—Daniel G. DePumpo
*Attorney, Agent, or Firm*—Philip Young

[57] ABSTRACT

A segmented seal ring and spring system for steam turbines for minimizing leakage between rotating and stationary components, and preventing damage and wear thereto, including a segmented seal ring, with first springs biased against the seal segments to urge the segments radially outward toward a large clearance position of the seal ring with respect to the turbine shaft. The springs urge the seal segments into the large clearance position at low shaft speeds and small turbine loads, whereas at medium to high flows and high working pressure, working fluid will overcome the spring forces and urge the seal segments into a small clearance position. Special gravity springs are provided in the lower half seal ring segments with the lower end of such springs seated against the turbine casing while the upper spring end is biased against the seal segment to produce an upward force which neutralizes the downward force caused by the weight of the segment. The gravity spring provides a spring force in the vertical direction which is equal to the weight of the segment which it supports so that the fluid pressure forces required to close the lower seal segments is the same as the radially outward biasing spring force and the friction forces. The gravity springs, by reducing or eliminating the weight forces of the lower seal segments, avoids the friction and interference which might otherwise interfere with the radial inward movement of the segments to the small clearance position.

24 Claims, 8 Drawing Sheets

FIG.5
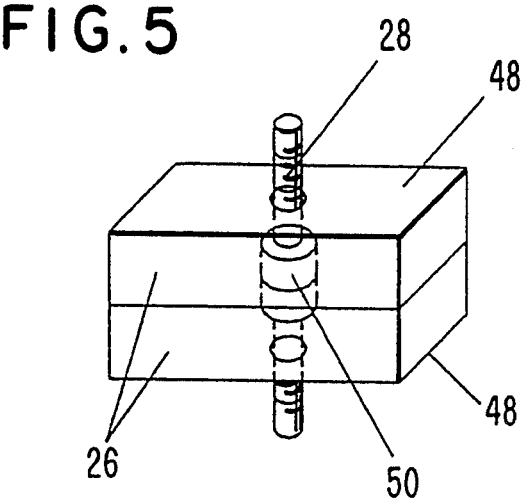
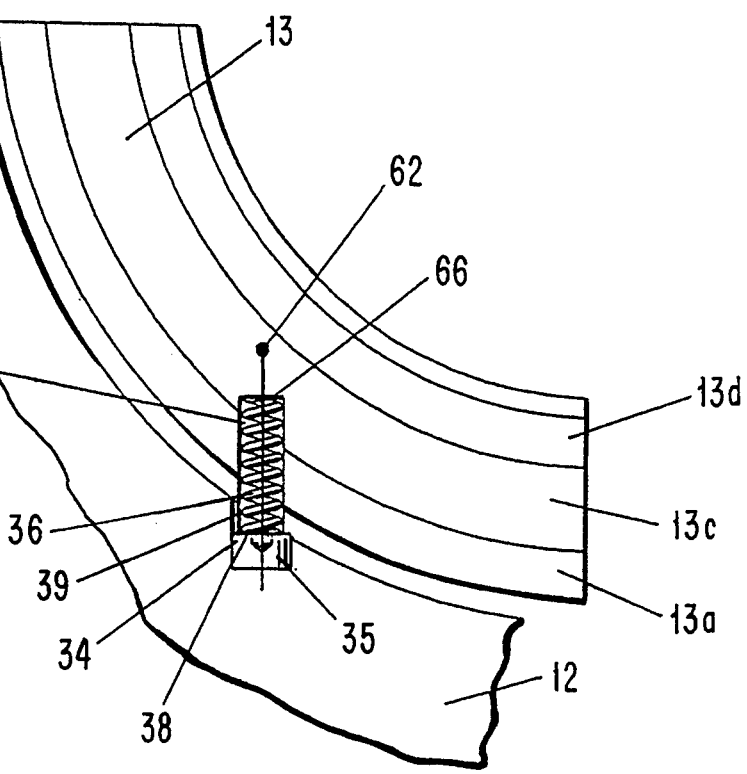
FIG.6

RETRACTIBLE SEGMENTED PACKING RING FOR FLUID TURBINES HAVING GRAVITY SPRINGS TO NEUTRALIZE PACKING SEGMENT WEIGHT FORCES

BACKGROUND OF THE INVENTION

Field of The Invention

The present invention relates to seals employed in elastic fluid axial flow turbines and, more particularly, to segmented packing ring seals arranged both where rotatable shafts penetrate stationary turbine casings and, in addition, internal to the casings between stages and turbine sections.

Description of The Prior Art

Generally, such known seals prevent or reduce leakage of the fluid by creating small clearance areas with low flow coefficients between the rotating and stationary parts. Improved efficiency, minimized loss of fluid and prevention of undesirable side effects caused by leakage of fluid are objectives of such seals.

Also, these segmented, labyrinth type seals are vulnerable to rubbing damage caused by turbine misalignment, vibration and thermal distortion. Most of these damage causing factors are more likely to occur during starting, at light loads or following sudden loss of load. As a result, it would be desirable to create a condition of relatively large clearance during these conditions, to minimize possible damage to the seals, and yet still accomplish a small clearance condition at higher loads. The higher load condition corresponds to operation when efficiency is of greatest value and where turbine operation is stable relative to most of the factors which can cause damage to the seals.

It should be recognized that turbine designers already take significant steps to minimize fluid leakage. The seals are made of materials specially selected to minimize damage caused by rubbing. The seal geometry is designed with thin teeth to require the least amount of heat and force during rubbing situations.

Retractable packing rings which, during start-up conditions, have large radial clearance that automatically decreases to a small clearance condition when a predetermined flow condition has been reached, have also been successfully applied in turbine applications where the pressure forces are significantly greater than the weight forces of the packing segments. In the low pressure stages, however, weight forces are often too large to be successfully overcome by available turbine pressure forces. As a result, in the lowest pressure stages, it has not been practical to provide retractable packing rings. This necessitates the use of seal rings that are spring backed to force the packing segments to be in a close clearance position at all times. One such spring backed seal ring arrangement is shown in the U.S. Pat. No. 4,017,088 issued on Apr. 12, 1977 to G. Lergen wherein the patentee provides springs directed to urge the sealing rings inward toward the rotor at all times. The spring-backed seal rings allow rubbing forces to shift the rings to minimize rubbing forces and damage. The springs are arranged to push the seal rings toward the shaft, but not beyond a limiting position provided by shoulders located on the stationary parts. While the patent to Lergen provides spring pressure to assist in maintaining the seal rings inward, close to the rotor to improve their sealing function, such patent provides no solutions to the problems associated with start up rubbing, wear and vibration.

By contrast, in the U.S. Pat. No. 3,594,010 to L. Warth, there is disclosed an asymmetric seal design in which, instead of the conventional T-shaped seal ring segments and corresponding turbine casing, Warth employs an asymmetric seal ring in which the right side of the seal ring "T" is cut very short and the turbine casing is similarly shaped. In order for Warth to employ radial acting springs at the one side shoulder on the upstream side, and the cut off overhang part of the seal ring on the downstream side, the patentee Warth assumes negligible side friction forces. This very asymmetric segment configuration, with a radial directed spring interposed between a limb at one side of the segment and the casing, provides no means to maintain the circumferential positions of the seal segments as they are moved in and out by the spring and turbine action. Furthermore, in such Warth design, the segments positioned at the side of the turbine may sag downward, due to weight forces, when in the closed position and thereby may interfere with the bottom segment in its path of closure and impose an added force upon such bottom segment as it must overcome its own weight and friction in addition to pushing the side segments upward as the bottom segment moves to its closed position. This may significantly increase the friction forces and make closure of the bottom seal segment very difficult, if not unlikely. Thus, Warth's system does not, and cannot, provide means for maintaining the circumferential positions of the ring segments as they are moved radially in and out by the spring and turbine action.

In the U.S. Pat. No. 4,436,311 issued on Mar. 13, 1984 to Ronald E. Brandon, the patentee of the subject patent application, there is disclosed a segmented labyrinth-type shaft sealing system for fluid turbines wherein radial positioning springs are designed to bias the seal segments outward towards a large clearance position, so that the seals of a segmented seal ring are caused to be positioned at the large clearance position during starting or at low load conditions when there are low speeds and small turbine loads, and to be positioned at a small clearance position during medium to high load conditions when there are high flows and high working fluid pressure.

When designing the individual springs acting upon the seal ring segments, fluid pressure forces, and the weight and friction forces of the seal ring segments are among the factors to be considered for the seal ring segments such that the segments are in the large and small clearance positions during the respective low load and high load conditions. However, in a retractable seal ring application, it may be possible that the seal ring segments situated at the bottom and lower side portions around the turbine circumference become stuck in position due primarily to weight forces from the upper ring segments bearing thereon and, therefore, such seal ring segments may not readily close into the small clearance position in the desired manner. This may reduce the efficiency of the turbines due to increased fluid flow leakage, and cause seal damage and greater wear, thereby increasing maintenance costs.

SUMMARY OF THE INVENTION

Accordingly, it is an object of the present invention to provide a seal ring arrangement which overcomes the packing seal and tip seal rubbing problems occurring during the turbine start up period, shutdown and low load conditions. It is another object to provide a seal ring arrangement wherein the clearance of the seal ring segments is large during turbine starting, shutdown and low load conditions, and such clearance is small during turbine operation at medium to high loads. It is another object to provide a seal ring arrangement wherein the seal ring segments are caused to move in a uniform manner between a large clearance position and a small clearance position without interference caused between segments. It is another object to provide a seal ring arrangement which having spring means designed to operate in accordance with the fluid pressure forces, the weight and friction forces on the individual seal ring segments based on their circumferential position within the turbine. It is a further object to decrease the cost of maintaining turbines due to seal damage, while increasing operating efficiency by permitting smaller operating clearance with lower leakage flow coefficients than presently known.

These, and other objects, are achieved by the present invention which provides a segmented seal ring and spring system for steam turbines for minimizing leakage between rotating and stationary components, including a segmented seal ring being supported by and at least partially contained in an annular T-shaped groove formed in the turbine casing and extending circumferentially around the turbine shaft. The spring system includes springs positioned to be biased against the segments of the seal ring to urge the segments radially outward toward a large clearance position of the seal ring with respect to the turbine shaft. The individual strengths of the springs are selected depending on the circumferential positions of the seal segments, the fluid pressure forces, and the weight and friction forces to thereby assure that the seal ring segments are in the large clearance position at the low shaft speeds and small turbine loads, whereas at medium to high flows and high working pressure, working fluid which is freely admitted to the annular space between the casing and the ring segments will overcome the spring forces and urge the seal segments into the small clearance position.

Special gravity springs are provided in the lower half seal ring segments with the lower end of such springs secured to the turbine casing while the upper spring end is biased against the seal segment to produce an upward force on the segment to counter the downward force caused by the weight of the segment. The gravity spring may have a spring force in the vertical direction which is equal to the weight of the segment which it supports so that the fluid pressure forces required to close the seal segment is approximately equal to the radially outward biasing spring force and the friction forces.

BRIEF DESCRIPTION OF THE DRAWINGS

FIG. 5 is a detailed view of special locking keys employed to support the upper half of the seal ring segments;

FIG. 6 is a side view of a gravity spring in its vertically acting position in a bore extending into a lower seal segment;

DESCRIPTION OF THE PREFERRED EMBODIMENTS

Figure 1:
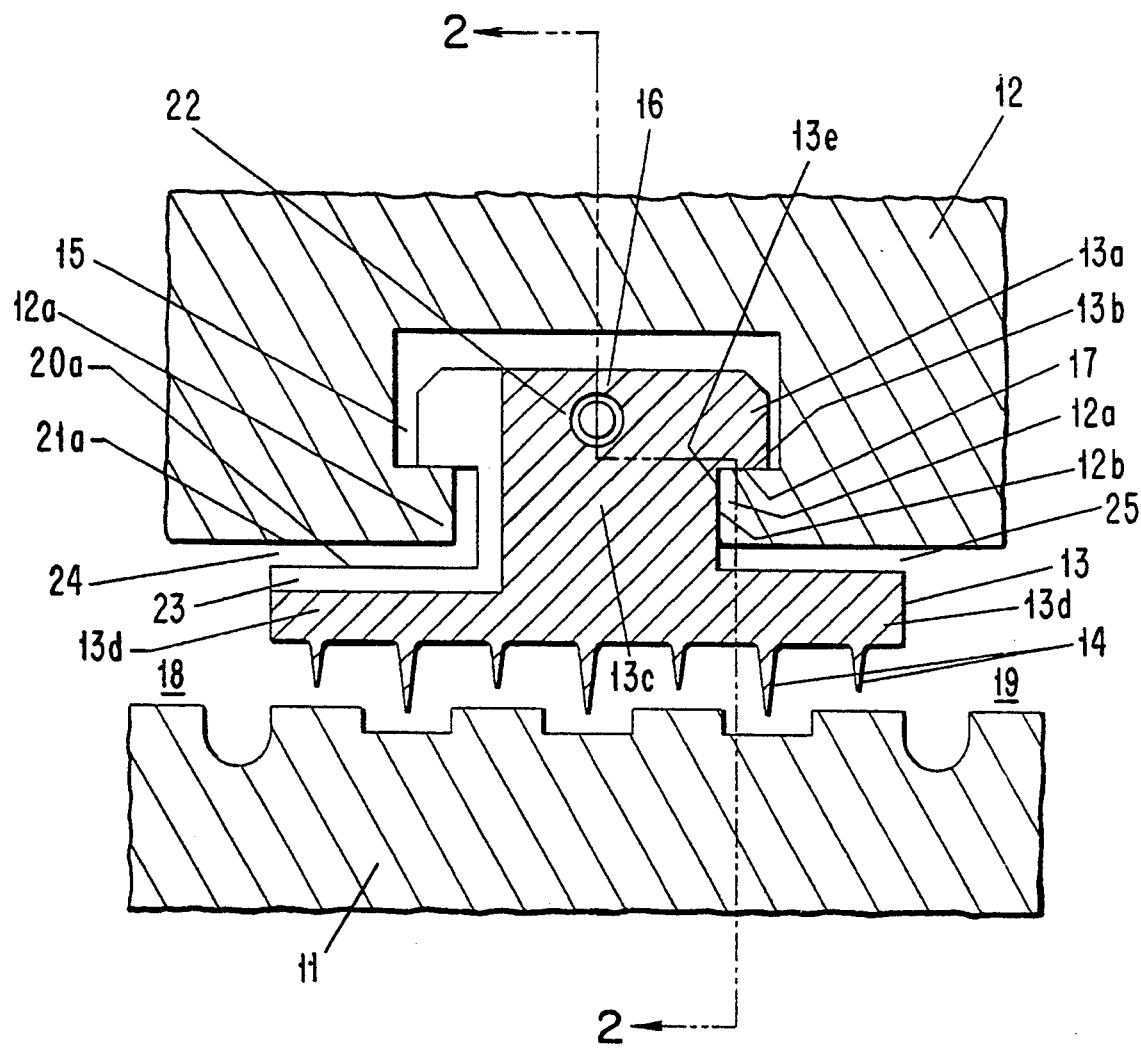
FIG. 1 is a partial longitudinal sectional view of a horizontal elevation of a portion of one stage of a multistage axial flow elastic turbine, with the section taken through one segment of a segmented seal ring.
Figure 2:
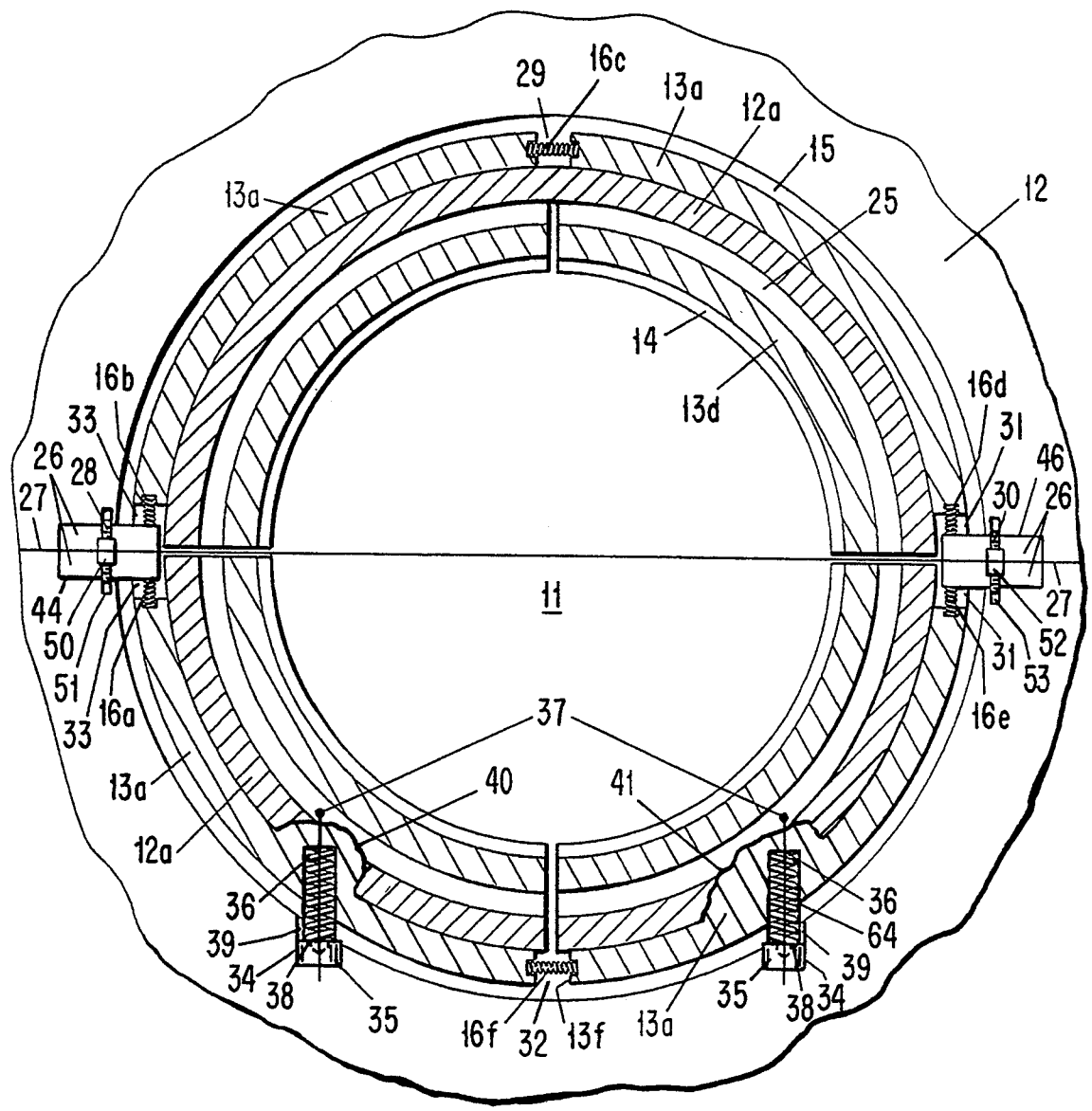
FIG. 2 is a transverse cross sectional view taken along lines 2—2 of FIG. 1 showing a four segment seal ring with both the springs for biasing the segments radially outward, and the gravity springs shown by the fragmentary sectional view through the sealing ring segments, according to one embodiment of the invention.

Referring to FIGS. 1 and 2, the turbine includes a rotor or shaft, a portion of which is shown at 11, and a casing, a portion of which is shown at 12. With regard to interstage seals, it is noted that the casing 12 may also be referred to as a diaphragm. A seal ring 13 is shown comprising four segments according to the embodiment shown in FIG. 2 extending around the rotor 11. It should be understood that several such seal rings 13 could be arranged in series. Also, it should be understood that the remainder of the turbine necessarily includes means, not shown, for introducing steam at high pressures and exhausting it at lower pressures, with conventional nozzles, buckets, wheels and other components which do not need inclusion herein to describe the seal function which is carried out by the seal ring of the present invention. In general, the seal ring shown and described herein is typical of the many rings employed throughout the turbine, with the exception of the seal ring modifications made in combination with the spring design described herein according to the present invention. Also, it is to be understood that "seal ring 13" and "seal ring segment 13" as used herein may apply to either a ring or segment and, therefore, should be read in the context of the sentence describing the same.

The seal ring 13 includes a plurality of teeth 14 that are disposed in opposition to circumferential portions of the rotor 11 which are alternately stepped up and down in radius. It is noted that other tooth arrangements may be employed. With high pressure fluid at side 18 of the seal ring 13 and low pressure fluid at side 19, respectively, the left and right sides of the seal ring 13 shown in FIG. 1, there will be a positive force to cause fluid leakable between the multiple restrictions formed between the small clearance openings between the teeth 14 and rotor 11. The combination of the clearance area, the relative sharpness of the teeth, the number of restrictions, the fluid conditions including pressure and density, and the geometry of the leakage path determine the amount of leakage flow according to formulae and empirical components which are well known.

Figure 4:
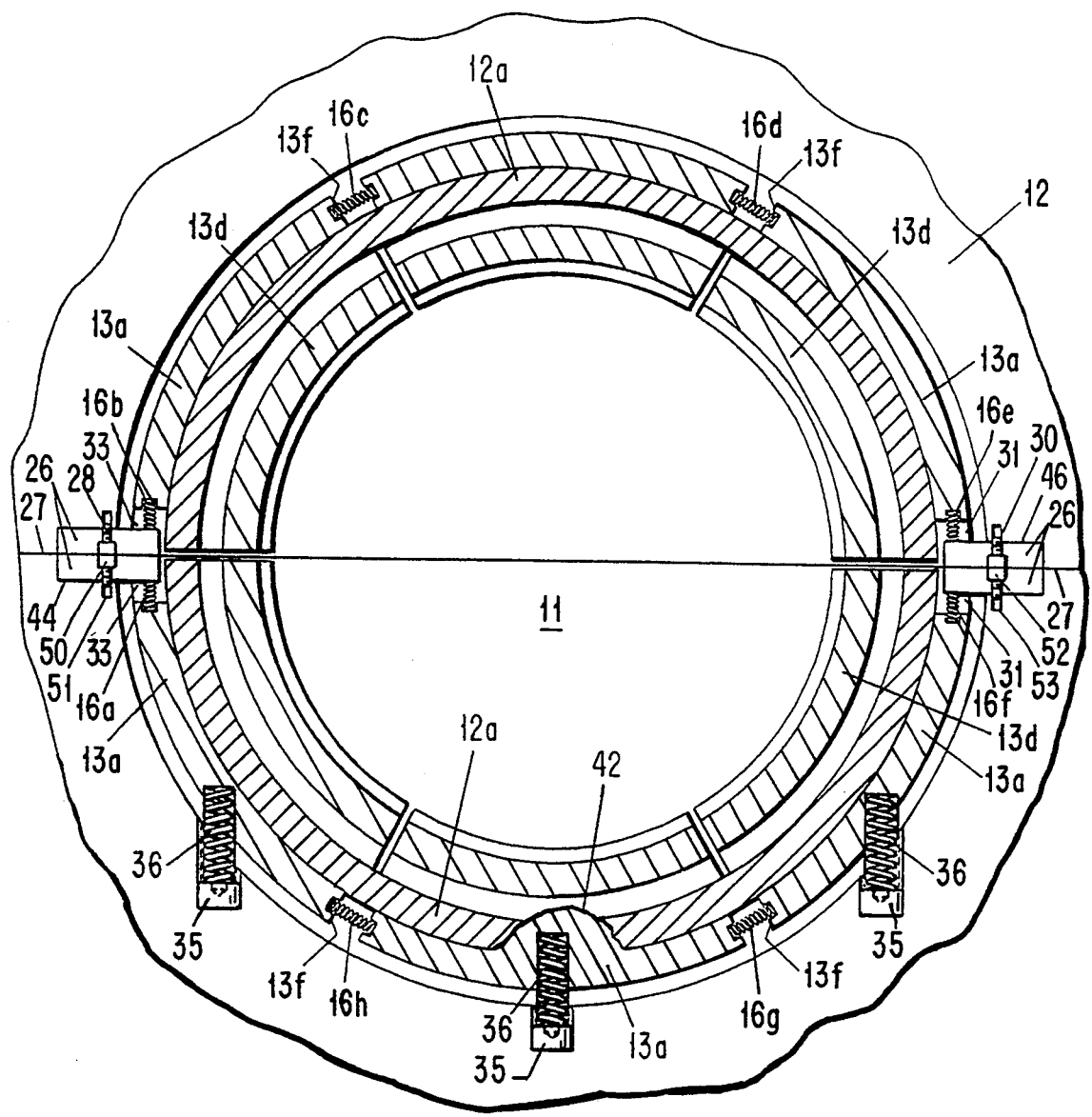
FIG. 4 is a transverse cross sectional view, similar to that taken along lines 2—2 of FIG. 1, of another segmented seal ring and spring combination comprising a six segment seal ring with eight springs interposed between adjacent ends of selected segments for biasing the segments radially outward into the large clearance position, and gravity springs for the two lower side segments and the bottom segment, the gravity spring in the bottom segment shown by the fragmentary sectional view through the bottom segment according to another embodiment of the invention.
Figure 10:
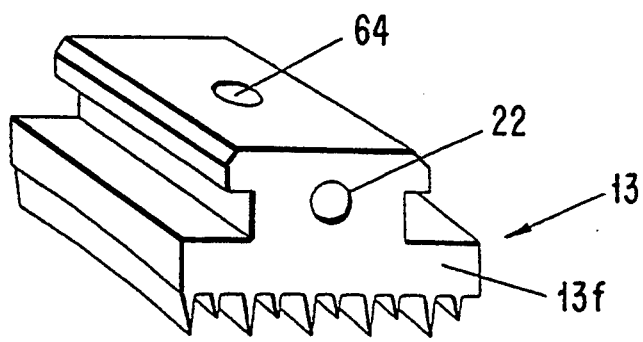
FIG. 10 is a perspective view of one seal ring segment.

The seal ring 13 is retained in a groove 15 of the casing 12. According to the embodiment shown in FIG. 2, the seal ring 13 is comprised of four segments arranged in a ring around the rotor 11, with the segments being disposed within the casing groove 15 to accommodate assembly or disassembly of the casing by locating the seal ring sections to separate at the joint 27 of the casing. Coil springs, generally indicated by numeral 16 in FIG. 1, but more specifically indicated by 16a-16f in FIGS. 2 and 4, are located at segment ends, indicated by the butt end 13f in FIGS. 2 and 10, of each seal ring segment 13, interposed in a compressed condition between the adjacent ends 13f of the segments to bias the ring segments to move to the large clearance position. The springs 16a-16f are positioned to fit in bores or pockets 22 formed in the ends 13f of the seal segments 13. Six (6) springs 16a-16f are employed between the segments in the four segment seal ring 13 shown in FIG. 2. Here, a top spring 16c is interposed in the common space 29 between the upper left and the upper right seal rings 13, two springs 16d and 16e respectively acting against the upper right segment 13 and the lower right segment 13 in their spaces 30 and 31, two springs 16b and 16a respectively acting against the upper left segment 13 and the lower left segment 13 in their spaces 33, and a lower spring 16f interposed in space 32 between the bottom ends of the lower left segment 13 and the lower right segment 13.

Positive circumferential location of the segments 13 and retainment of the seal segments 13 and springs 16 are assured by anti-rotation keys 26 which are provided above and below the casing joints 27. The anti-rotation keys 26 are shown in detail in FIG. 5 and include a rectangular key block 48 fitted in grooves 44 and 46, respectively, in the left and right sides of casing 12. Key blocks 48 protrude out from the casing 12 into the spaces 31 and 33 where such key blocks 48 provide a fixed horizontal support surface for the upper and lower segments of the seal ring 13 as well as segregating the upper and lower ring segments. The springs 16a and 16b, and 16d and 16e, are interposed between the key blocks 48 and the butt ends 13f of the seal segments. Anti-rotation keys 26 are secured to the casing 12 by mounting screws or bolts 50 and 52 attached, respectively, at the left and right sides, to the key blocks 44 by threaded screw ends 28 and 30 extending into the casing 12 in bores 51 and 53 both below and above the key block 48. Mounting screws 50 and 52 include spring mounted means for extending the screw ends 28 and 30 into bores 51 and 53. It is noted that the lower half of the anti-rotation keys 26 may be deleted as desired, such as by securing the upper keys 26 to the casing 12 by bolts, such as 28 or 30. The anti-rotation keys 26 retain and locate the springs in proper alignment with their associated seal ring segments. The anti-rotation keys 26 also assist the springs in maintaining their circumferential positions as the seal ring segments are urged in their large clearance position, with essentially no circumferential displacement of the seal ring segments occurring.

Referring again to FIGS. 1 and 2, each segment of the seal ring 13 is shown including an inner ring portion, indicated by the numeral 13d, and having the seal teeth 14 extending from its radially inward surface while its radially outward surface 20a limits the large clearance by means of its contact with the radial surface 21a of the casing 12. The seal ring 13 also includes an outer ring portion 13a disposed within the casing groove 15 with an inner circumferential surface 13b which, as described below, limits the small clearance position of the seal ring segments by restraining their radial inward movement by contact of such surface 13b with a surface 17 on a shoulder 12a of casing 12. The seal ring 13 also includes a neck portion 13c between the inner ring portion 13d and the outer ring portion 13a into which the shoulder 12a of casing 12 is interlocked to thereby axially locate the ring segment. The seal ring neck portion 13c forms a T shape with the outer ring portion 13a and such neck portion 13c provides a contact pressure surface by means of contact of its neck surface 13e with the shoulder surface 12b of casing 12.

Figure 8:
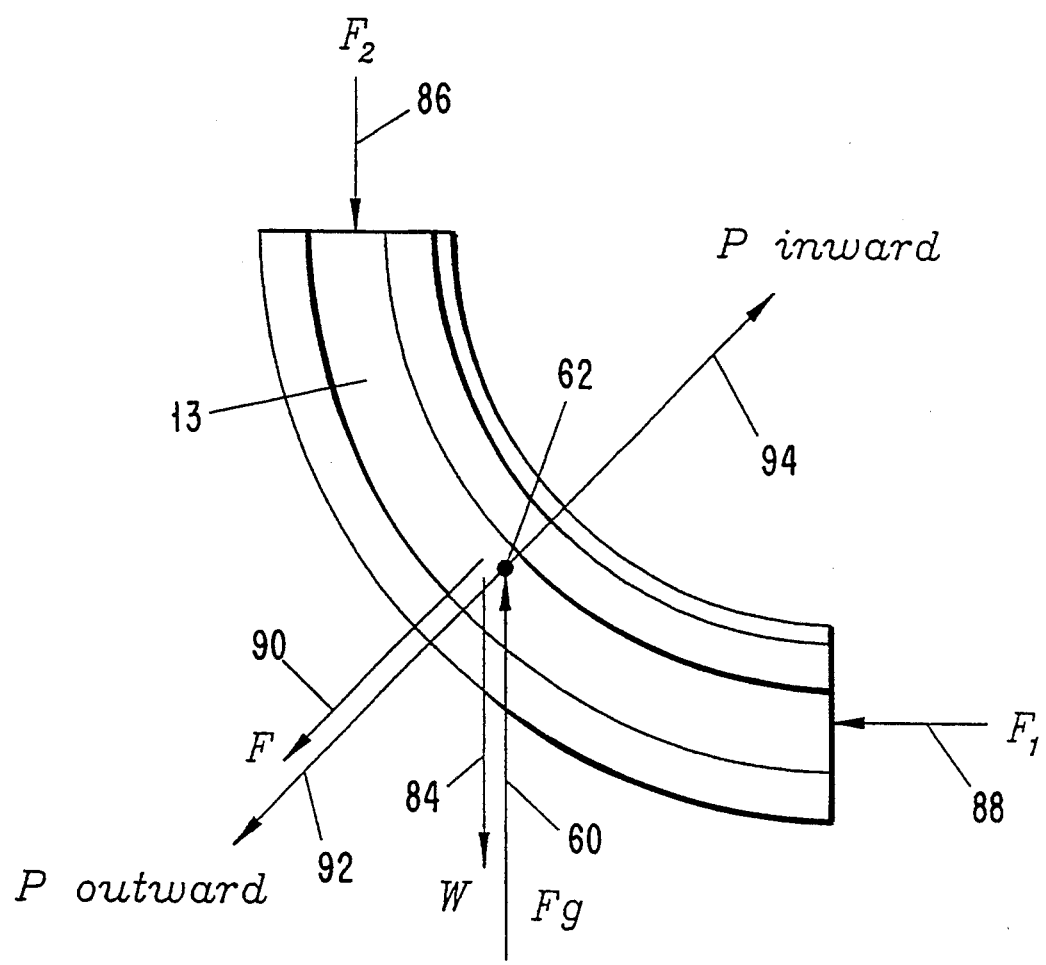
FIG. 8 is a force diagram showing the main four forces acting on a lower side segment.

Referring to FIG. 2, 6 and 8, a gravity spring 36 is contained in each of the left and right lower half seal segments 13 and extends downward into a bore or pocket 34 in the casing 12 to make contact with a flat surface 38 provided by a plug 35 secured to the casing 12. This flat horizontal bottom surface is required for the vertical spring 36 to insure that the force opposing the spring can be accurately determined. In lieu of the plug, this flat surface can be provided by machining a flat spot, not shown, on the casing 12 at the bottom of the spring pocket 34. In either case, the unmachined part of the casing 12 adjacent to the spring 36 should be rounded, as shown at 39, as necessary to permit the withdrawal or insertion of the packing ring segment 13 with the spring in its place. As shown in FIG. 2 by the fragmentary sectional view indicated by the numerals 40 and 41 taken through the lower half seal segments 13, and in FIG. 6, gravity spring 36 produces an upward force on the segment 13 at the outer ring portion 13a so as to counter the downward force caused by the weight of the segment 13. Preferably, the spring force from gravity spring 36 acts upward on a vertical line that passes through the center of gravity 37 of the segment. This is shown in the force diagram of FIG. 8 by a vertical upward force 60 produced by the gravity spring 36 and directed against such lower seal segment 13 at its neck portion 13c. The upward force 60 is, preferably, directed to pass through the center of gravity 62 of the lower left seal segment 13. FIG. 6 shows the location of the gravity spring 36 positioned to extend into a cylindrical bore or pocket 64 formed through the seal segment outer ring portion 13a to a depth in the area of the seal ring neck portion 13c where the spring butts against the end wall 66 of the pocket 64. In the force diagram shown in FIG. 8, the weight W of the seal segment 13 is about equal to the upward force Fg of the gravity spring 36.

Figure 3:
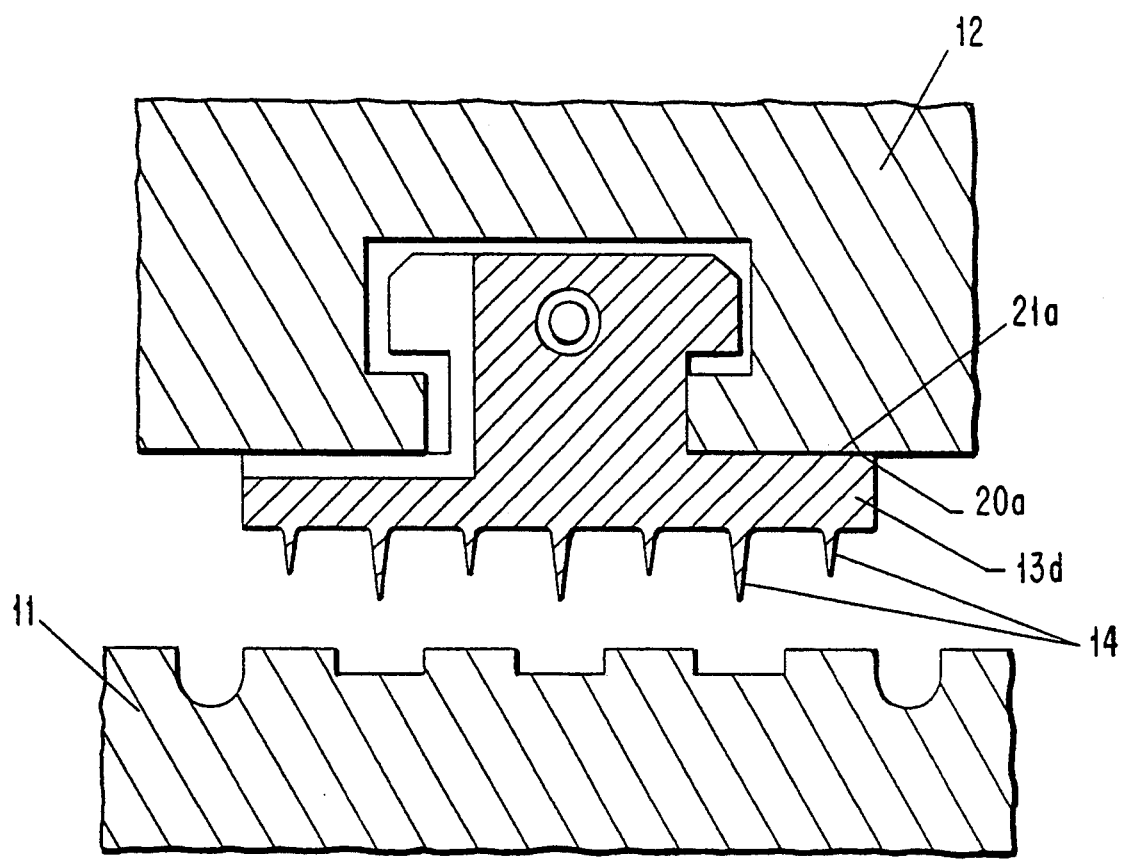
FIG. 3 is a transverse cross sectional view taken along line 2—2 of FIG. 1, but differing in that the four segment seal ring is shown in the large clearance position, as contrasted with the small clearance position shown in FIGS. 1 and 2.

At low or no load conditions, only the weight of the seal ring segments 13, the confining limits of the casing 12 and the force of the springs 16a-16f and the gravity springs 36 act on the seal rings 13. The springs are selected with sufficient force and dimension under these conditions to cause the seal ring segments 13 to separate at each segment joint. In the preferred arrangement wherein the springs 16a-16f are interposed between the adjacent butt ends 13f of the rings, such springs urge the segments in a circumferential direction to cause the segments to separate at each segment joint, thereby causing the seal ring segments to seek larger diameters limited by the defined large clearance position, as shown in FIG. 3, where there are no annular spaces 24 and 25. Here, the radially outward surface 20a of inner ring portion 13d contacts the radial surface 21a of the casing 12. At this point of contact, referred to herein as the "large clearance position", shown in FIG. 3, no further enlargement of the seal ring can occur. The annular space 24,25 is sized to permit, by the radially outward movement of the ring segments 13, sufficient space to accommodate the worst expected transient misalignment of rotor and casing, without damage to the seal ring teeth 14. This annular space design will vary, depending on the type and size of the turbine. Upon the buildup of load, the pressure forces will overcome the forces of springs, and the seal ring segments 13 will move radially inward up to the point of contact between the segment surface 13b and the casing shoulder surface 17.

One advantage of this spring and seal ring design is that the springs interposed at the circumferential ends 13f between the seal ring segments 13 act to maintain such segments in their circumferential positions so that closure of the seal ring segments to the small clearance position does not require both circumferential and radial movement. This is because the seal ring segments and the springs interposed therebetween together form a continuous ring around the rotating shaft which expands and contracts between the large and small clearance positions. This spring and seal design maintains and controls the circumferential positioning of the seal ring segments so that closure does not require both radial and circumferential movement of the seal rings and any interference or lock-up of the seal rings between each other is avoided. Furthermore, the gravity springs 36 assist in reducing or eliminating the effect of the weight forces of the lower seal segments which might otherwise interfere with the radially inward movement of the seal rings, as will be described in further detail hereinbelow.

After the turbine has been accelerated to operating speed and partially loaded, the worst of thermal gradients, vibration and misalignment problems are ended. As the load is increased, the fluid pressure increases proportionately around the rings in such fashion, as discussed further, hereinbelow, to cause the springs 16 to be compressed and the seal ring segments 13 to move radially inward until restrained by contact of seal ring surface 13b with the casing surface 17. The dimensions of the seal ring 13 at its surface 13b and the casing surface 17 are selected to create the smallest clearance between the teeth 14 and the rotor surface determined to be practical for loaded, relatively steady state operations.

In FIGS. 1 and 2, the seal ring 13 is shown in its high load, small clearance condition. The higher pressure side of the seal is indicated at numeral 18. This higher pressure persists in the annular spaces 24 and 15 as the result of an open communication created by one or more openings 23. The openings may, for example, be made by local cutouts in the high pressure side of shoulder 12a. The relatively low pressure side of the seal is indicated by the numeral 19, and such lower pressure condition persists also in the annular space 25.

It can be readily recognized that the resultant axial force of these pressures will cause the seal ring to be pushed toward the low pressure area 19 so as to create a leak resistant seal between the contact seal surface 13e and the casing surface 12b. For a geometry of known dimensions and pressures, the magnitude of this axial force can be easily calculated. Also, there can be calculated the radial forces required to overcome metal to metal friction in order to move the seal ring in a radial direction.

In a similar fashion, but somewhat more complicated, the radial forces forces can also be determined. With the exception of the pressure distribution along the seal ring inner surface, on the inner seal portion 13d, facing the rotor 11, all other pressures were identified in the two paragraphs above. There will be a pressure drop across each tooth 14 of the seal. Using the known condition of flow continuity through each tooth, with constant enthalpy expansions, a relatively accurate distribution of pressure can be calculated using a series of constant area throttlings. On some packing rings, a high mach number will exist to complicate the calculation, but this will be known and accounted for by those skilled in the art.

Figure 7:
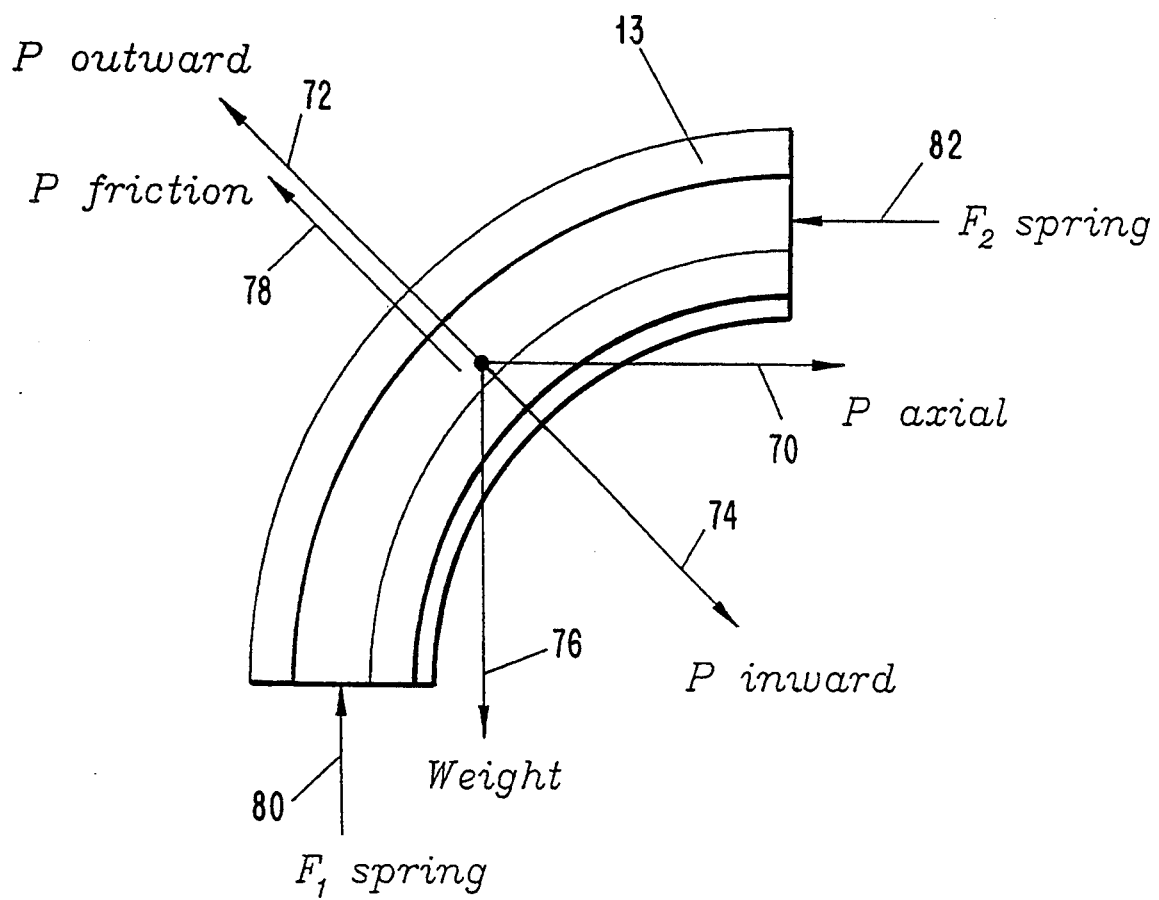
FIG. 7 is a force diagram showing the main four forces acting on an upper side segment.

The radial pressure distribution is used to select the dimensions of the seal ring 13 to achieve the appropriate resultant inward force on the seal ring 13. More particularly, FIG. 7 shows the four forces which must be considered and employed in order to properly resolve the seal ring rubbing problem described above for the seal ring segment and, in this case, for an upper seal ring segment. The first of these forces are the axial and radial steam pressure forces, P(axial) indicated at 70, P(outward radial) at 72, and P(inward radial) at 74. The second of these forces is the weight force W(weight) at 76 of the seal ring 13. The third of these forces is the friction force F(friction) at 78 between the seal ring 13 and it holder, namely the casing 12, which resists motion of the seal ring 13. The fourth force(s) are the spring forces F1 and F2, indicated at 80 and 82, provided by the springs 16 described herein. It is noted that there is also a small pressure force on the segment butt ends 13f which adds to the spring forces 80 and 82. The design goal is to establish for the seal ring 13 a force condition that will cause the ring 13 to overcome its weight, spring and friction forces so as to shift such seal ring to its inward or small clearance position, shown in FIGS. 1 and 2, for the fluid pressure conditions which can be predicted to exist when the turbine is operating at a small, but significant, load such as 15 to 35%.

As will be recognized by those familiar with elastic fluid turbines, the internal pressure at most locations throughout the turbine is approximately proportional to the load. As the load and mass flow is increased, local pressure is increased in approximately linear fashion. Under these circumstances, the pressure drop across turbine stages and most turbine seal rings also increases in a predictable and linear fashion with increasing load and fluid flow. It is this relationship that can allow a designer to select a condition of load and pressure for each seal ring wherein the pressure forces can be expected to overcome the combination of weight, spring and friction forces so as to move the seal ring to its small clearance position. As described above, the designer can partially control this circumstance by varying the dimensions, weight and spring constants employed within the seal ring and spring combination.

In the example of sealing rings operating in high pressure portions of turbines, the weight forces are small relative to available steam forces and proper operation is assured as described in the above-referenced U.S. Pat. No. 4,436,311 issued to Ronald E. Brandon, the applicant herein. However, for turbine locations with relatively small pressure conditions, the segments must be made lighter in weight and with weaker spring constants for the radially outward directing springs, in this case the springs 16. These weight and spring constant adjustments may not be adequate. Thus, the present invention provides the gravity springs 36 for the purpose of opposing the effects of gravity on certain seal segments 13, as described above, that would ordinarily require adequate pressure forces to not only compress the springs 16 and overcome friction, but to additionally lift the weight of the lower seal segments in order to cause such segments to shift to the close clearance position. It is noted that in the case of the upper seal segments, such as shown in FIG. 2, the equivalent of gravity springs 36 are provided at the horizontal joint as springs 16b and 16d. Such springs 16b and 16d must be selected and sized to provide a vertical force equal to the weight of each segment plus an additional amount to resist the pressure forces forces tending to force the segment toward the close clearance position. The top spring 16c must provide sufficient force to resist the tendency of the seal segments to sag at the top due to their own weight and, in addition, prevent premature closure from pressure forces.

For the lower seal segments 13, it may be desirable to select the gravity force Fg, indicated at 60 in FIG. 8, of the gravity spring 36 to be equal in its vertical force component to the weight W, indicated at 84, of the seal segment so that motion to close the segment can be simply achieved by overcoming the forces 86 and 88 of springs 16a and 16f and the friction force 90. It should be noted that the butt forces, such as those at 86 and 88 shown in FIG. 8, include not only the spring force discussed above, but also a small pressure force that acts on the area of the butt 13f, tending to resist closure. The spring forces 86 and 88 are selected to permit closure when the pressure forces, P(outward) at 92 and P(inward) at 94, have reached a small but significant load on the turbine, such as 10 to 25%. In this fashion, the gravity springs 36 have been provided to permit the lower half seal segments 13 to function as though they had little or no weight, thereby permitting closure of the retractible seal segments and ring to a small clearance position even on turbine stages operating at very low pressure levels.

It is noted that as the segments close; the spring forces will change as a result of motion or extension position of the spring. Here, it is preferable to employ springs having forces that remain fairly constant through the range of motion expected. Where there is any significant change in the spring force over the range of spring forces, such changes must be considered in the calculations and selection of springs and seal rings. Also, other types of springs than those coil springs illustrated herein may be employed, such as flat springs. The springs must have long life and stable characteristics while exposed to high temperature, vibration and, possibly, corrosive conditions.

Those skilled in the art will be able to determine all forces described and shown in the FIGS. 2, 6, 7 and 8, thereby determining the spring forces required of the springs to achieve the objects of the invention described herein. It is preferred that all of the forces acting on each segment be summed for radial and circumferential components. When the forces resisting closing motion equal those forces causing motion, it will be known that further increase in flow will cause closing motion.

Figure 9:
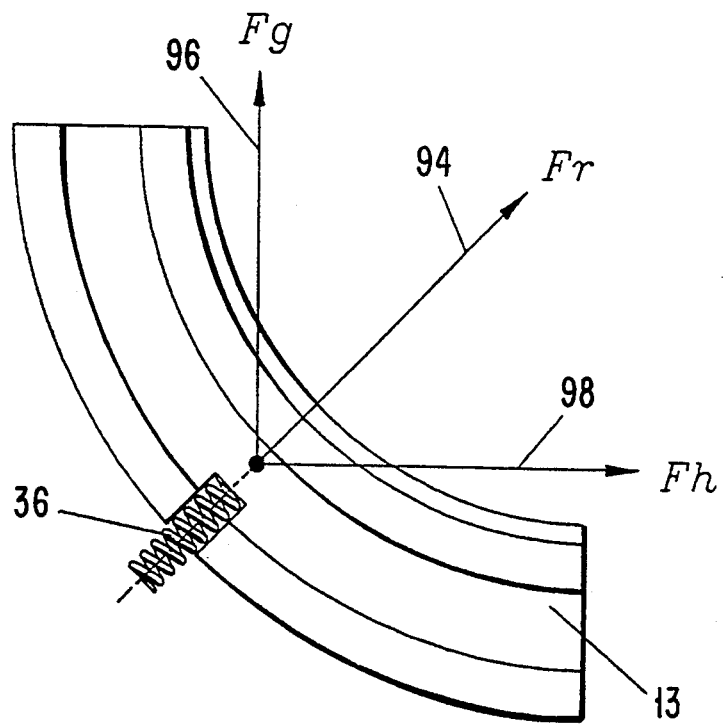
FIG. 9 shows an alternate gravity spring adapted for directing a radial inward force against a lower seal segment, with the force diagram having an upward gravity component.

While the coil gravity springs 36 have been shown and described above as being directed to push vertically upward against the lower seal segments 13, it is noted that, alternately, the springs 36 can be arranged to push in a radial direction, as shown by such spring 36 in FIG. 9, with a sufficient magnitude of radial force Fr at 94 that its vertical component of force Fg at 96 is approximately equal to the segment weight W. In such case, the springs 16, and more specifically the spring 16f shown in FIG. 2, must be designed to take into consideration the horizontal force component Fh at 98 of spring 36.

Referring to FIG. 4, there is a modified packing arrangement wherein six sealing segments 13 constitute the ring, with four springs 16b, 16c, 16d and 16e mounted in the top seal segments, and four springs 16f, 16g, 16h and 16a mounted in the bottom seal segments 13 at the end portions 13f to thereby bias the segments 13 to move radially outward into the large clearance position described above. Here, three gravity springs 36 are located in pockets in the casing 12, in a manner similar to that described with respect to the FIG. 2 embodiment, and also extend into pockets in the bottom and two lower side seal segments 13 and produce the forces to counteract or neutralize the weight of the lower and bottom segments 13. A fragmentary sectional view, indicated by the numeral 42, is taken through the bottom seal segment 13. Also, as described above with respect to the FIG. 2 embodiment, the anti-rotation keys 26 are also provided for the side seal segments and are attached to the casing 12 by essentially the same manner as in the FIG. 2 embodiment.

While the description and drawings have been provided for preferred embodiments of the present invention, various other modifications may be made without departing from the spirit and scope of the present invention . For example, the upward component of vertical force provided by each gravity spring need not fully balance or neutralize the weight component of its respective lower seal ring segment, but rather may be selected to partially balance the weight of such seal segment, in those cases where fluid pressure forces are sufficient to offset a portion of the weight of the seal segment.

What is claimed is:

1. An elastic fluid turbine employing a segmented seal ring to minimize leakage between rotating and stationary components, while also providing a large clearance between said components during start up and at light loads to protect said seal ring from damage, comprising:
   a stationary turbine casing encircling a rotating shaft and having an annular T-shaped groove formed therein and extending circumferentially around said shaft, said annular groove being partially defined by a pair of opposing, spaced apart annular shoulders on said casing which form an annular opening of said groove radially into the clearance area between said casing and said shaft;
   a segmented seal ring supported by and at least partially contained in said groove, said seal ring including both upper seal segments located around the upper half of said shaft, and lower seal segments located around the lower half of said shaft, each seal segment having seal teeth;
   radial springs positioned against said seal segments to urge said seal segments radially outward to form a larger diameter ring providing a large clearance position of said seal ring with said shaft, said radial springs providing radially outward forces whereby at low speed and small turbine loads the radial spring forces will predominate and said seal segments will be forced to said large clearance position, whereas at high flows and high working pressure, working fluid will overcome the radial spring forces and urge said seal segments into a small clearance position; and gravity spring means including at least one gravity spring positioned generally vertically between a lower half of said turbine casing and at least one lower seal segment, each said gravity spring producing an upward vertical force against said lower seal segment which is substantially equal to and thereby counteracts the downward weight force of said lower seal segment;

whereby each said gravity spring, by only neutralizing said weight forces of said lower seal segments, does not interfere with the action of said radial springs to urge said seal segments out to said large clearance position at low speed and small turbine loads, and each said gravity spring prevents friction and interference between adjacent said seal segments as they move radially inward to said small clearance position under the influence of the working fluid at high flows and high working pressure.

2. An elastic fluid turbine as recited in claim 1, wherein each of said gravity springs comprises a compressed coil spring having a lower spring end and an spring upper end, with its lower spring end seated against said lower half of said turbine casing, and its upper spring end biased against a lower seal segment to produce an upward vertical force against said seal segment.

3. An elastic fluid turbine as recited in claim 2, further comprising means, on said turbine casing, for securing said lower end of each of said gravity springs to said turbine casing.

4. An elastic fluid turbine as recited in claim 2, wherein said turbine casing includes a pocket for receiving the lower end of said gravity spring, and a seat at the bottom of said pocket providing a flat bottom surface for said lower spring end of said gravity spring, and said lower seal segment includes a pocket for receiving said upper end of said gravity spring therein.

5. An elastic fluid turbine as recited in claim 2, wherein each of said gravity springs is positioned vertically with said lower spring end located vertically below said upper spring end.

6. An elastic fluid turbine as recited in claim 2, wherein said gravity spring is positioned on said turbine casing so that its spring force is directed upward in a line of force which passes through the center of gravity of the lower seal segment against which said gravity spring is directed.

7. An elastic fluid turbine as recited in claim 1, wherein said segmented seal ring comprises two upper seal segments and two lower seal segments, with each of said lower seal segments having one of said gravity springs directed thereagainst to provide an upward vertical force against each of said two lower seal segments to counteract the weights of the respective segments.

8. An elastic fluid turbine as recited in claim 1, wherein said segmented seal ring comprises three upper seal segments and three lower seal segments, with each of said three lower seal segments having one of said gravity springs directed thereagainst to provide an upward vertical force against each of said three lower seal segments to counteract the weights of the respective seal segments.

9. An elastic fluid turbine as recited in claim 1, wherein said segmented seal ring comprises a plurality of individual seal ring segments separated by individual ones of said radial springs interposed therebetween, each of said radial springs comprising a compressed spring interposed at the butt ends of said opposing seal segments to bias said seal segments radially outward to said large clearance position.

10. An elastic fluid turbine as recited in claim 9, further comprising anti-rotation keys attached to said casing at a location near the intersection between said upper and lower seal ring segments, said anti-rotation keys being interposed between an upper radial spring and a lower radial spring for fixedly supporting said radial springs and retaining and locating said radial springs and seal segments in circumferential position by preventing seal ring rotation in relation to said casing.

11. An elastic fluid turbine employing a segmented seal ring to minimize leakage between rotating and stationary components, while also providing a large clearance between said components during start up and at light loads to protect said seal ring from damage, comprising:

a stationary turbine casing encircling a rotating shaft and having an annular groove formed therein extending around said shaft, said annular groove being partially defined by a pair of opposing, spaced apart annular shoulders on said casing which form an annular opening of said groove radially into the clearance area between said casing and said shaft;

a segmented seal ring supported by and at least partially contained in said groove, said seal ring including both upper seal segments located around the upper half of said shaft, and lower seal segments located around the lower half of said shaft, each seal segment having seal teeth;

first spring means comprising radial springs for radially positioning said segments of said seal ring and including a compressed spring interposed between adjacent ends of said seal ring segments so that said radial springs act circumferentially to urge said ring segments to separate and move radially outward to form a larger diameter ring and thereby provide a large clearance position of said seal ring with said shaft; and second spring means comprising at least one gravity spring positioned to operate generally vertically between a lower half of said turbine casing and at least one said lower seal segment, said gravity spring means producing an upward vertical force against said lower seal segment which is substantially equal to and thereby counteracts the downward weight force of said lower seal segment;

said large clearance position being defined such that at low speed and small turbine loads the spring forces will predominate and said segments of seal ring will be forced to said large clearance position, whereas at high flows and high working pressure, working fluid will overcome the radial spring forces and urge said seal ring segments into a small clearance position;

whereby said gravity springs, by only neutralizing said weight forces of said lower seal segments, do not interfere with the action of said radial Springs to urge said segments out to said large clearance position at low speed and small turbine loads, and said gravity springs prevent friction and interference between adjacent said lower seal segments as they move radially inward to said small clearance position under the influence of the working fluid at high flows and high working pressure.

12. An elastic fluid turbine as recited in claim 11, wherein each of said gravity springs comprises a compressed coil spring having a lower spring end and an spring upper end, with its lower spring end seated against said lower half of said turbine casing, and its upper spring end biased against a lower seal segment to produce an upward vertical force against said seal segment.

13. An elastic fluid turbine as recited in claim 12, further comprising means, on said turbine casing, for securing said lower end of each of said gravity springs to said turbine casing.

14. An elastic fluid turbine as recited in claim 12, wherein said turbine casing includes a pocket for receiving the lower end of said gravity spring, and a seat at the bottom of said pocket providing a flat bottom surface for said lower spring end of said gravity spring, and said lower seal segment includes a pocket for receiving said upper end of said gravity spring therein.

15. An elastic fluid turbine as recited in claim 12, wherein each of said gravity springs is positioned vertically with said lower spring end located vertically below said upper spring end.

16. An elastic fluid turbine as recited in claim 12, wherein said gravity spring is positioned on said turbine casing so that its spring force is directed upward in a line of force which passes through the center of gravity of the lower seal segment against which said gravity spring is directed.

17. An elastic fluid turbine as recited in claim 11, wherein said segmented seal ring comprises two upper seal segments and two lower seal segments, with each of said lower seal segments having one of said gravity springs directed thereagainst to provide an upward vertical force against each of said two lower seal segments to counteract the weights of the respective segments.

18. An elastic fluid turbine as recited in claim 11, wherein said segmented seal ring comprises three upper seal segments and three lower seal segments, with each of said three lower seal segments having one of said gravity springs directed thereagainst to provide an upward vertical force against each of said three lower seal segments to counteract the weights of the respective seal segments.

19. A seal system employing a segmented seal ring to minimize leakage between a rotating shaft and a stationary casing of an elastic fluid turbine, wherein said seal system provides a large clearance between said shaft and casing during start up and at light loads to protect said seal ring from damage, comprising:

a segmented seal ring supported by and at least partially contained in said groove, said seal ring including both upper seal segments located around the upper half of said seal ring, and lower seal segments located around the lower half of said seal ring, each seal segment having seal teeth;

radial springs positioned against said seal segments to urge said seal segments radially outward to form a larger diameter ring providing a large clearance position of said seal ring with said shaft, said radial springs providing forces whereby at low speed and small turbine loads the radial spring forces will predominate and said seal segments will be forced to said large clearance position, whereas at high flows and high working pressure, working fluid will overcome the radial spring forces and urge said seal segments into a small clearance position; and gravity spring means including at least one gravity spring positioned at the bottom of at least one said lower seal segment, said gravity springs positioned to operate generally vertically producing an upward vertical force against said lower seal segment which is substantially equal to and thereby counteracts the downward weight force of said lower seal segment;

whereby said gravity springs, by only neutralizing said weight forces of said lower seal segments, do not interfere with the action of said radial springs to urge said segments out to said large clearance position at low speed and small turbine loads, and said gravity springs prevent friction and interference between said seal segments as they move radially inward to said small clearance position.

20. A seal system as recited in claim 19, wherein each of said gravity springs comprises a compressed coil spring having a lower spring end and an spring upper end, with its lower spring end adapted to be seated against said turbine casing, and its upper spring end biased against a lower seal segment to produce an upward vertical force against said seal segment.

21. A seal system as recited in claim 20, wherein each of said gravity springs is positioned vertically with said lower spring end located vertically below said upper spring end.

22. A seal system as recited in claim 20, wherein said gravity spring is positioned in said seal ring segment so that its spring force is directed upward in a line of force which passes through the center of gravity of the lower seal segment.

23. A seal system as recited in claim 20, wherein the vertical upward component of force of each of said gravity springs is equal to the weight of the lower seal segment against which its respective gravity spring is directed.

24. A seal system as recited in claim 19, wherein said segmented seal ring comprises a plurality of individual seal ring segments separated by individual ones of said radial springs interposed therebetween, each of said radial springs comprising a compressed spring interposed at the butt ends of said opposing seal segments to bias said seal segments radially outward to said large clearance position.

* * * * *